Aug. 9, 1938.  J. P. AUSTIN  2,125,871

FOLDING OPTICAL DEVICE

Filed Oct. 28, 1936  2 Sheets-Sheet 1

INVENTOR
JOHN P. AUSTIN
BY
ATTORNEY

Aug. 9, 1938.   J. P. AUSTIN   2,125,871
FOLDING OPTICAL DEVICE
Filed Oct. 28, 1936   2 Sheets-Sheet 2
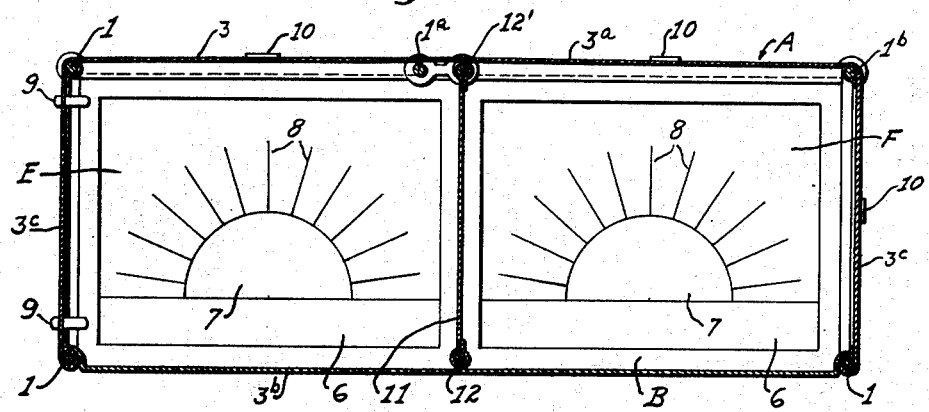
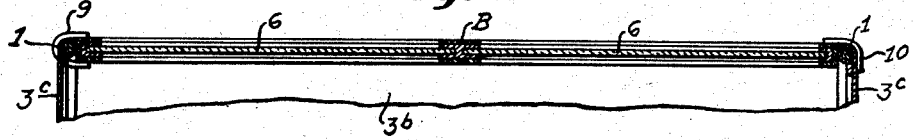
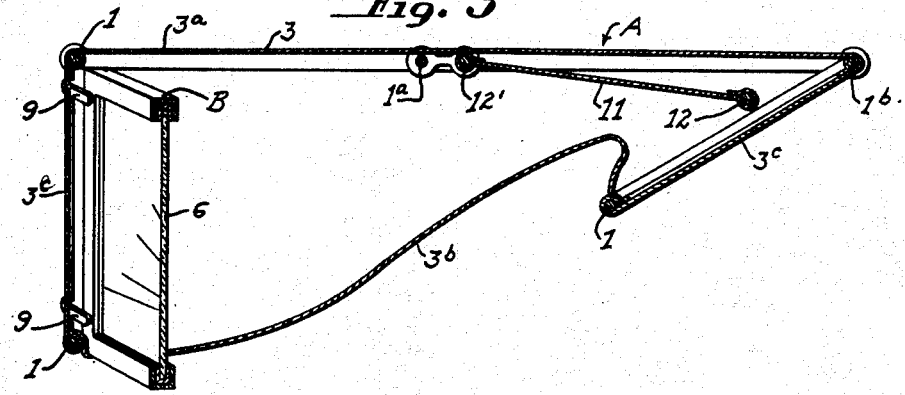
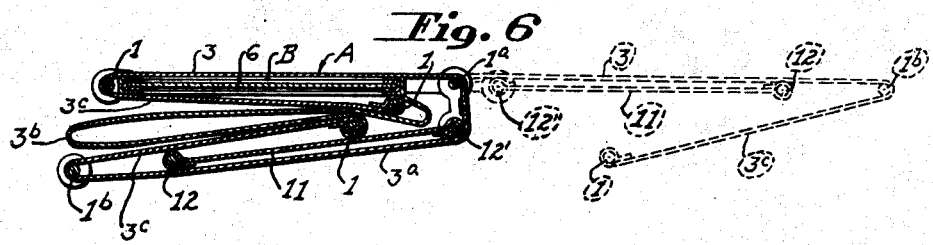
INVENTOR
JOHN P. AUSTIN
BY
ATTORNEY Patented Aug. 9, 1938

2,125,871

UNITED STATES PATENT OFFICE 2,125,871

FOLDING OPTICAL DEVICE

John P. Austin, St. Louis, Mo.

Application October 28, 1936, Serial No. 107,932

1 Claim. (Cl. 35—17)

My invention relates to a folding optical device, and has for an object to produce a compact, foldable device which may be quickly and conveniently folded or unfolded, and when folded may be conveniently carried in a pocket or purse.

Another object of my invention is to produce an optical device which, when expanded, may be fitted to the head so that the eyes of a person may properly focus upon the translucent view or views contained in said device without any appreciable outside light being admitted to the said device, except such light as passes through the view or views contained in said device.

Another object is to produce an optical device which will tend, when used, to produce a feeling of relaxation and comfort both mental and physical in order to bring about a condition of rest to mind and body.

Fig. 3 is a cross-sectional view of my new device looking toward the end containing the translucent views.

Fig. 4 is another cross-sectional view taken through the end containing the translucent views.

Fig. 5 is another cross-sectional view showing my new device when the folding operation is commenced.

Fig. 6 is another cross-sectional view showing my new device in completely folded position, with portions in dotted outline in partly folded position.

Figure 1:
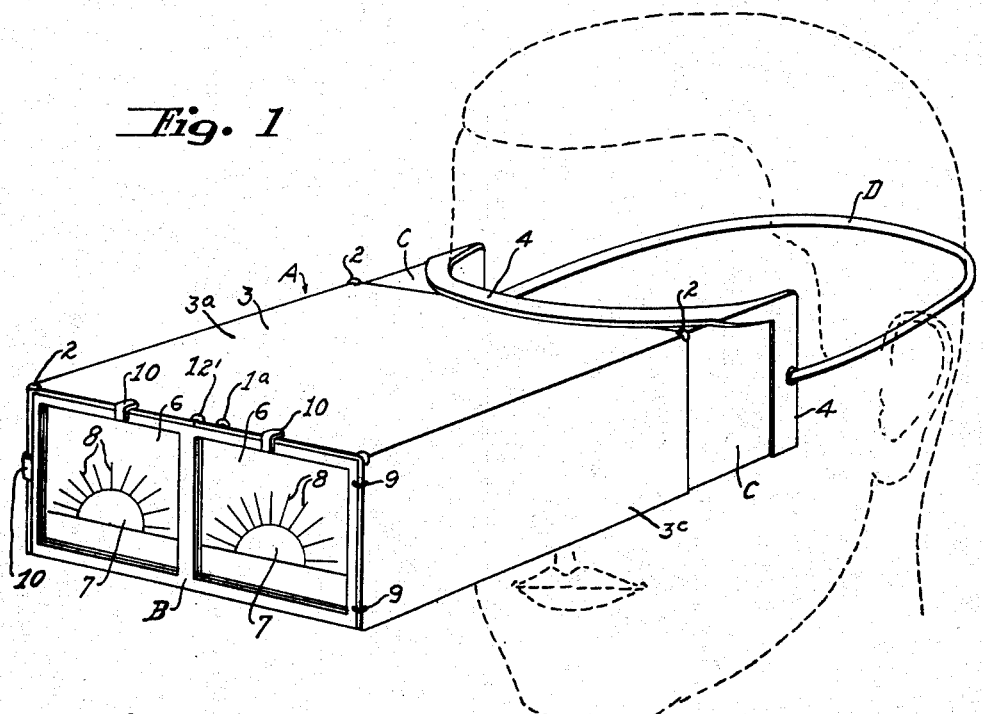
Fig. 1 is a perspective view of my new device in position on the head of a person.
Figure 2:
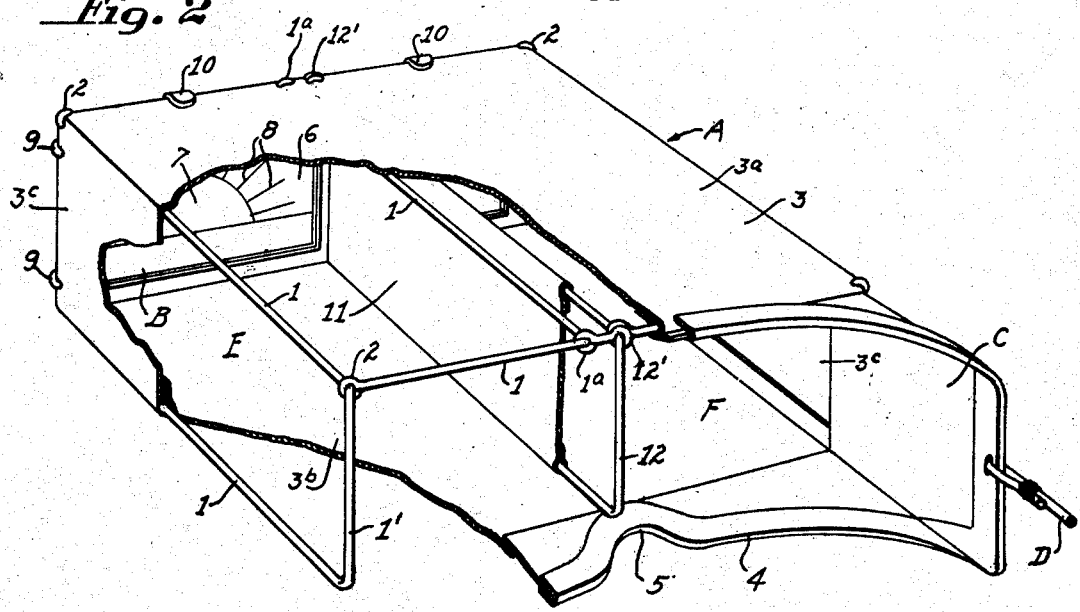
Fig. 2 is another perspective view of my new device with the material partly broken away.

In the drawings A designates the box portion of my device, B is the view end of said device, C are the temple portions of said device, and D is the elastic band for passing around the head to hold said device in position for viewing the view end B of said device.

The framework of my device preferably consists of a series of wires 1 so formed and joined together as at 2 that said framework may be folded upon itself. A covering material 3 is provided of such color as will substantially completely exclude light passing therethrough. This covering consists of a top section 3ª, a bottom section 3ᵇ, and side sections 3ᶜ. The cover 3 is tightly wrapped about the longitudinally extending wires 1 of the framework and secured in position in any desired manner, such as by stitching or cement, as may be most appropriate, and which I have not deemed it necessary to illustrate. The longitudinally extending wires 1 are bent vertically as at 1' at the front and rear of the device to provide the vertical clearance necessary to comfortably accommodate the use of the device to the eyes of the wearer thereof. Adjoining the eyes of the wearer is, preferably, a protecting web 4 which may be made of elastic material and is adapted to exclude the passage of light between the face of the wearer and the body of the device. A portion 5 of the web 4 is adapted to receive the nose of the wearer.

Preferably I employ two translucent views 6, which are also preferably identical, and for my purpose I prefer to depict in rosy colors the rising sun 7 with the rays 8 emanating therefrom. It will be noted that these views 6 are some distance from the eyes of the wearer, so as not to cause a tiring of the eyes by being focussed at too short a distance for comfort.

Hinges 9 are provided for fastening the view plate B to the wire framework 1, and catches 10 secure said view plate B to the opposite and upper sides of said framework 1 when the device is in open position. Preferably I divide longitudinally the interior of my device into two compartments E and F by the wall or web of flexible material 11. This wall is foldable upwardly and is carried by a wire framework 12 which is hinged at 12' to the top cross-sections of the framework 1 at the front and rear thereof. In Fig. 5 this division wall 11 is shown in partly folded position.

The device illustrated in Fig. 1 is fitted to the wearer's head, as shown, so that the translucent views 6 may be clearly apparent. It is desirable that light sufficient to make the views clearly visible be available and that the free end of the device be turned toward said light. The wearer then assumes a comfortable, relaxed position and gazes through the optical device in the direction of the rising sun views in rosy colors at the forward end of the device. With the mind fixed on the view and all other thoughts dismissed, concentrated attention is directed to the idea of the rising sun, with the result that in a relatively short space of time the whole body is thoroughly relaxed, the nerves are quieted, and the bodily and mental functions are normal, with the result that the brain and heart are restored to a relatively placid state, so that a complete rest is attained.

In Figs. 5 and 6 the progress of folding my device into compact form for carrying is illustrated. The inner longitudinal wall 11 is first folded upwardly on the hinge 12' against the inner surface of the cover 3. Then the right-hand side wall 3ᶜ is folded inwardly, as shown in Fig. 5. Then the view end B is detached from the wires 1 at the top and one side thereof and folded along the left-hand side wall 3c, as shown near the completion of such movement in Fig. 5.

The cover A is then folded with the wire framework as shown in Fig. 6, with the view portion F folded against the left-hand side wall 3c, then said left-hand side wall and infolded view portion are folded upwardly, as seen in Fig. 6, with the head band D also infolded. The framework 1 is then folded at the center thereof on the pivot point 1a and also on the pivot point 1b, with the cover material 3 folded over the wires constituting the pivot points 1a and 1b as well as the pivotal point 12' for the division wall 11. Thus, as shown in Fig. 6, the parts are compactly folded so as to occupy a minimum amount of space, and the device when so folded can be conveniently carried by the owner either in a pocket or a bag.

A folding optical device of the character which I have illustrated and described may at all times be carried by the owner, and when it is desired to employ the same it may be quickly unfolded and applied to the eyes and the relaxation and rest afforded by the use of this device secured. I believe that I have designed the simplest device, always available in compact and usable form, that can be employed whereby under almost any condition the user of the device may utilize the same to obtain beneficial relaxation and rest results.

While I have illustrated and described a particular form of my new optical device, it is to be understood that many variations of the same may be made without departing from the spirit of my invention.

I claim:

In a folding optical device, a foldable frame provided with an open end to accommodate the eyes of the wearer of such device, means for detachably securing said device in unfolded condition, a light-proof foldable cover for said frame, a pair of translucent views at the end of said frame opposite the said open end of said frame, a longitudinally positioned, foldable division wall located within said frame for vertically separating said views from each other from an optical standpoint, means for supporting said views in said foldable frame and retaining said views firmly in both folded and unfolded positions, means for excluding light between said device and the face of the wearer when said device is mounted on the head of the wearer, means for securing said device on the head of the wearer.

JOHN P. AUSTIN.